United States Patent [19]

Okubo et al.

[11] Patent Number: 5,282,675

[45] Date of Patent: Feb. 1, 1994

[54] BRAKING ANTI-LOCK CONTROL FOR VEHICLE

[75] Inventors: Satomi Okubo; Toshifumi Maehara, both of Saitama, Japan

[73] Assignees: Akebono Research and Development Centre, Ltd., Hanyu; Akebono Brake Industry Co., Ltd., Tokyo, both of Japan

[21] Appl. No.: 975,968

[22] Filed: Nov. 13, 1992

Related U.S. Application Data

[63] Continuation of Ser. No. 591,056, Oct. 1, 1990, abandoned.

[30] Foreign Application Priority Data

Sep. 29, 1989 [JP] Japan .................... 1-252211

[51] Int. Cl.$^5$ ................................ B60T 8/50
[52] U.S. Cl. .................... 303/108; 303/119.1
[58] Field of Search ........ 303/103, 108–110, 303/116.1, 119.1, 113.1, 111; 364/426.01–426.03

[56] References Cited

U.S. PATENT DOCUMENTS

| | | | |
|---|---|---|---|
| 3,888,549 | 6/1975 | Grosseau | 303/96 |
| 4,446,522 | 5/1984 | Sato et al. | 364/426.02 |
| 4,538,228 | 8/1985 | Breorey et al. | 303/20 X |
| 4,773,714 | 9/1988 | Shimanuki et al. | 303/108 |
| 4,805,102 | 2/1989 | Ise et al. | 364/424.05 |
| 4,865,399 | 9/1989 | Atkins et al. | 303/110 X |
| 5,016,178 | 4/1991 | Kuwana et al. | 303/110 X |
| 5,116,108 | 5/1992 | Sigl et al. | 303/103 |

FOREIGN PATENT DOCUMENTS

| | | | |
|---|---|---|---|
| 293906 | 12/1988 | European Pat. Off. | 303/110 |
| 3828241 | 5/1989 | Fed. Rep. of Germany | 364/426.02 |
| 64859 | 3/1988 | Japan | 303/108 |
| 52566 | 2/1989 | Japan | 303/108 |
| 132450 | 5/1989 | Japan | 364/426.02 |
| 2026637 | 2/1980 | United Kingdom | 303/110 |
| 8906615 | 7/1989 | World Int. Prop. O. | 364/426.02 |

Primary Examiner—Robert J. Oberleitner
Assistant Examiner—Alfred Muratori
Attorney, Agent, or Firm—Cushman, Darby & Cushman

[57] ABSTRACT

An anti-lock control arrangement for a vehicle which employs a control map for effectively preventing a wheel lock during braking. The control map is defined in terms of acceleration-deceleration values of a vehicle speed, which is to be controlled, and a speed difference between a target speed and a vehicle speed. The control map is read during anti-lock operation to effectuate control of the brake hydraulic pressure.

14 Claims, 7 Drawing Sheets

BRAKING ANTI-LOCK CONTROL FOR VEHICLE

This is a continuation of application Ser. No. 07/591,056, filed on Oct. 1, 1990, now abandoned.

BACKGROUND OF THE INVENTION

The present invention relates to anti-lock control for preventing a wheel lock when braking a running vehicle.

Vehicle anti-lock control systems are designed to ensure steering and running stability during braking and to reduce braking distance. In conventional anti-lock control arrangements, a control mode of brake hydraulic pressure is determined in accordance with an electric signal representative of a wheel speed detected by a wheel speed sensor. Based upon the signal, a control unit having a microcomputer controls a hold valve, in the form of a normally-open type solenoid valve, and a decay valve, in the form of a normally-closed type solenoid valve, to increase, decrease or hold the brake hydraulic pressure.

In a conventional anti-lock control arrangement, a reference speed for deciding when to decrease pressure is set or determined in accordance with a wheel speed (hereinafter referred to as "system speed Vs") to be controlled in each brake control system. There is also set an estimated vehicle speed Vv having a predetermined follow-up limit of the acceleration and deceleration with respect to the highest wheel speed among four wheel speeds. Further, there is set a threshold speed which tracks the estimated vehicle speed Vv by a predetermined value below the estimated vehicle speed. Based on the comparison of the system speed Vs with the reference speed or the threshold speed and also on the detected high peak point and low peak point of the system speed Vs, a pressure decrease status, a pressure hold status and a pressure increase status are set. Then, a plurality of hydraulic pressure control valves (solenoid valves) are turned on and off in accordance with a predetermined control mode set for each of these statuses, thereby effecting the pressure decrease, pressure hold and pressure increase.

However, in this conventional control method, the control mode remains fixed or unchanged until the status is changed, even when the wheel speed is abruptly changed due to variations in the road surface condition. Thus, conventional methods fail to react in a timely manner which is particularly disadvantageous because the wheels may lock during abrupt braking. Another disadvantage is that since the pressure increase is effected at the time when the wheel speed is recovered to a speed near the vehicle speed, the wheel speed is repeatedly accelerated and decelerated in a speed range having a certain slip rate with respect to the vehicle speed. As a result, the brake hydraulic pressure is increased and decreased causing a vibration of the vehicle body.

SUMMARY OF THE INVENTION

It is therefore an object of this invention to provide an anti-lock control arrangement (apparatus and method) which overcomes the above various disadvantages of the conventional anti-lock control method.

According to the present invention, a target speed VT follows an estimated vehicle speed Vv according to a predetermined relation. The estimated vehicle speed Vs is calculated based on the highest wheel speed among the four wheel speeds sensed during the braking. An acceleration-deceleration value dVs/dt is calculated from a system speed Vs. A control map is provided in terms of the acceleration-deceleration value dVs/dt and a speed difference E between the target speed VT and the system speed Vs. The control map defines three regions (a pressure increase region, a pressure decrease region, and a pressure hold region), a pressure increase gradient in the pressure increase region and a pressure decrease gradient in the pressure decrease region.

The control map is read to effectuate control of the brake hydraulic pressure.

DETAILED DESCRIPTION OF THE INVENTION

Preferred embodiments of the present invention will now be described with reference to the drawings.

Figure 1:
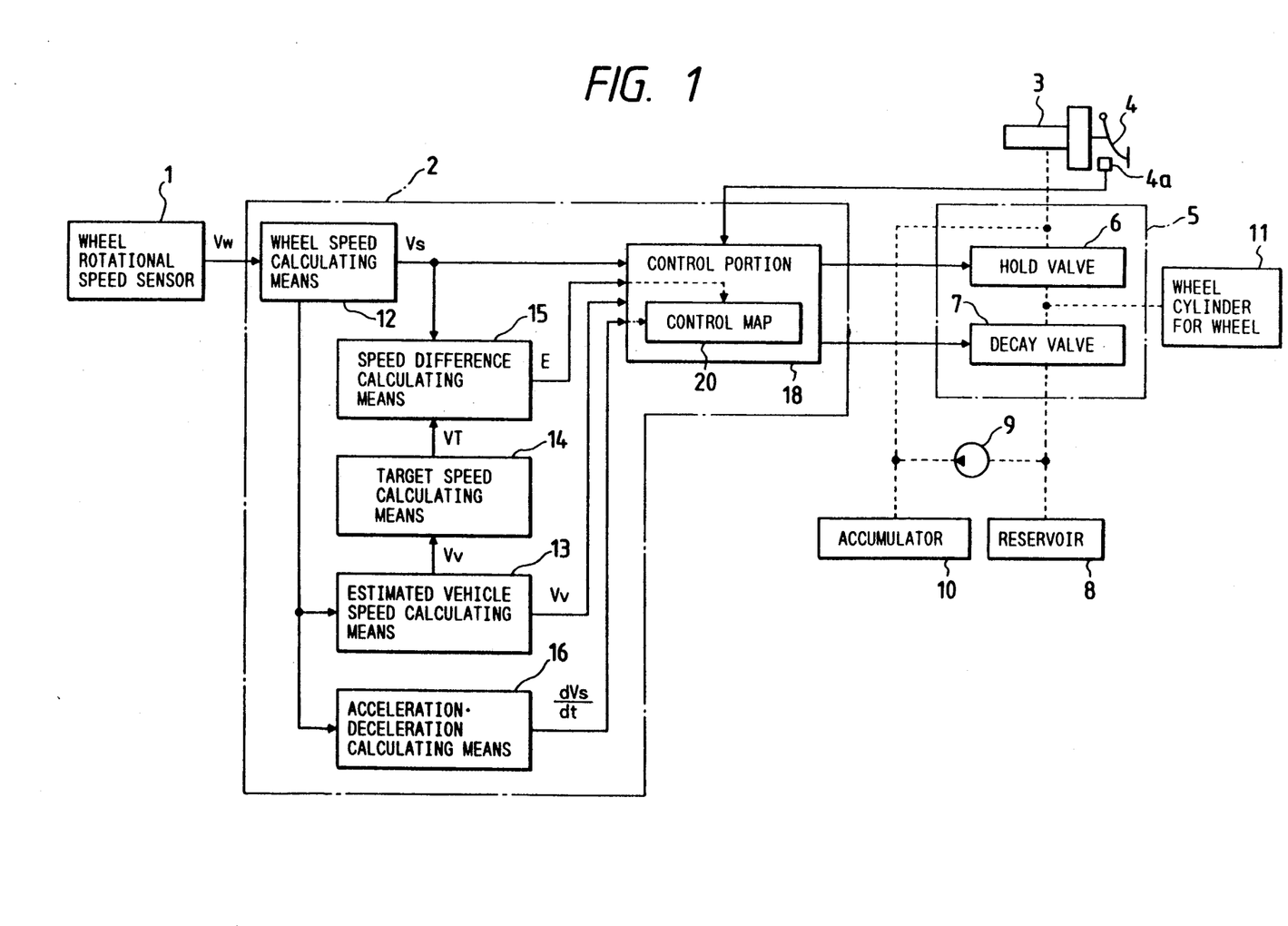
FIG. 1 shows a block diagram of a control system used in a first embodiment of an anti-lock control method of the present invention.

FIG. 1 shows a control system comprising wheel rotational-speed sensors 1 connected to the four vehicle wheels, a control unit 2 comprising a computer, a master cylinder 3 operated by a brake pedal 4, a modulator 5 including a hold valve (HV) 6 in the form of a normally-open type solenoid valve and a decay valve (DV) 7 in the form of a normally-closed type solenoid valve, a reservoir 8, and an accumulator 10. Brake fluid is pumped by a pump 9 from the reservoir 8 to the accumulator 10. A brake switch 4a is turned on when the brake pedal 4 is depressed, and reference numeral 11 denotes wheel cylinders of a brake device for the wheels.

The control unit 2 comprises speed calculating means 12, estimated vehicle speed calculating means 13, target speed calculating means 14, speed difference calculating means 15, acceleration-deceleration calculating means 16, and control portion 18. The speed calculating means 12 calculates a system speed Vs from the outputs of the wheel speed sensors 1. The estimated vehicle speed calculating means 13 selects the highest wheel speed from the four measured wheel speeds Vw (select-high) and estimates an estimated vehicle speed Vv through a filter of the acceleration and deceleration ±1G. The target speed calculating means 14 calculates a target speed VT which tracks the estimated vehicle speed Vv by a predetermined relationship. The speed difference calculating means 15 calculates a speed difference E between the system speed Vs and the target speed VT (i.e., E=Vs−VT). The acceleration-deceleration calculating means 16 calculates an acceleration-deceleration value dVs/dt of the system speed Vs. The control portion 18 is coupled to receive the system speed Vs, the speed difference E, the estimated vehicle speed Vv, and the acceleration-deceleration value dVs/dt. The control portion 18 also has a memory for storing a control map 20.

Figure 2:
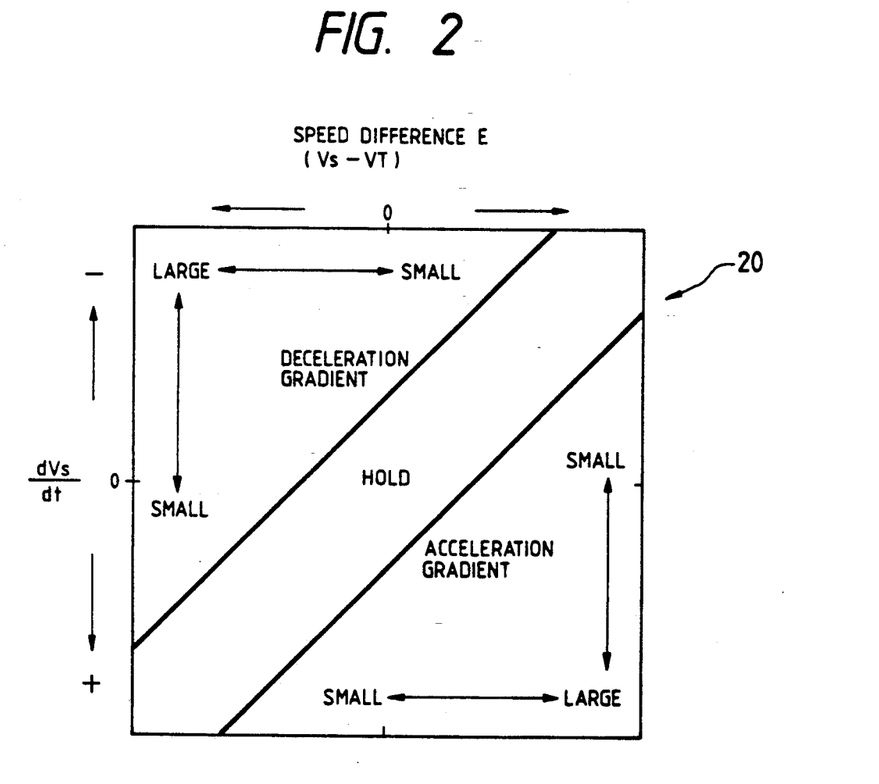
FIG. 2 shows a control map used in the anti-lock control method of the first embodiment.

FIG. 2 shows a control map according to the present invention. The control map represents a pressure increase region, a pressure hold region and a pressure decrease region of the brake hydraulic pressure. The abscissa axis represents the speed difference E between the target speed Vt and the system speed Vs calculated by the speed difference calculating means 15. The ordinate axis represents the acceleration-deceleration value dVs/dt of the system speed Vs calculated by the acceleration-deceleration calculating means 16.

The pressure increase region has a pressure increase gradient which varies within the region. Similarly, the pressure decrease region has a pressure decrease gradient which varies within the pressure decrease region. The pressure increase gradient represents a duty ratio of a pressure increase signal applied to the hold valve 6, and the pressure decrease gradient represents a duty ratio of a pressure decrease signal applied to the decay valve 7. The pressure increase and decrease gradients are employed as control values. The control portion 18 reads a control value from the control map 20 to control the ON-OFF of the hold valve 6 and the decay valve 7 to effect the increase, hold and decrease of the brake hydraulic pressure within each wheel cylinder 11.

One example of the anti-lock control of this embodiment will now be described with reference to a control time chart of FIG. 3 and a control flow chart of FIG. 4.

Figure 3:
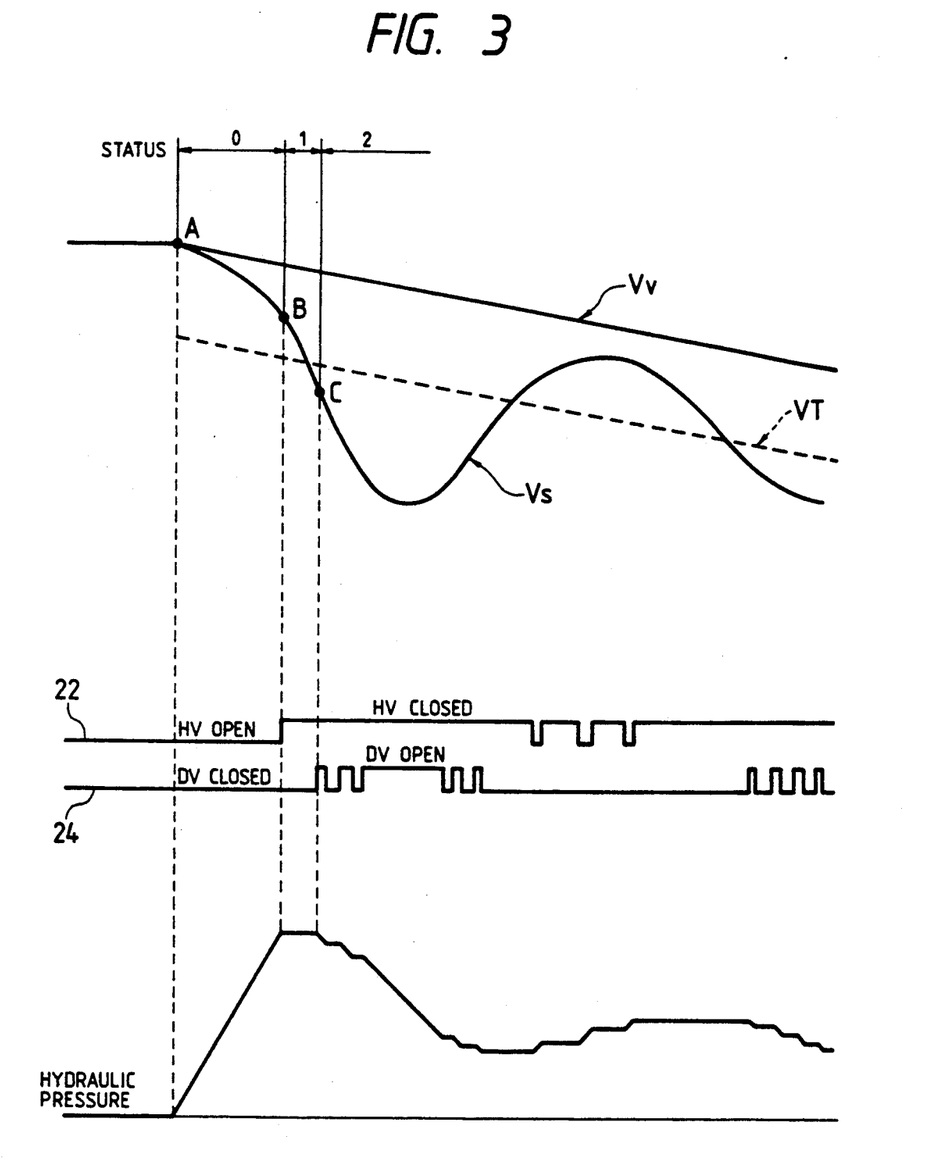
FIG. 3 shows a timing chart illustrating the anti-lock control system of FIG. 1.
Figure 4:
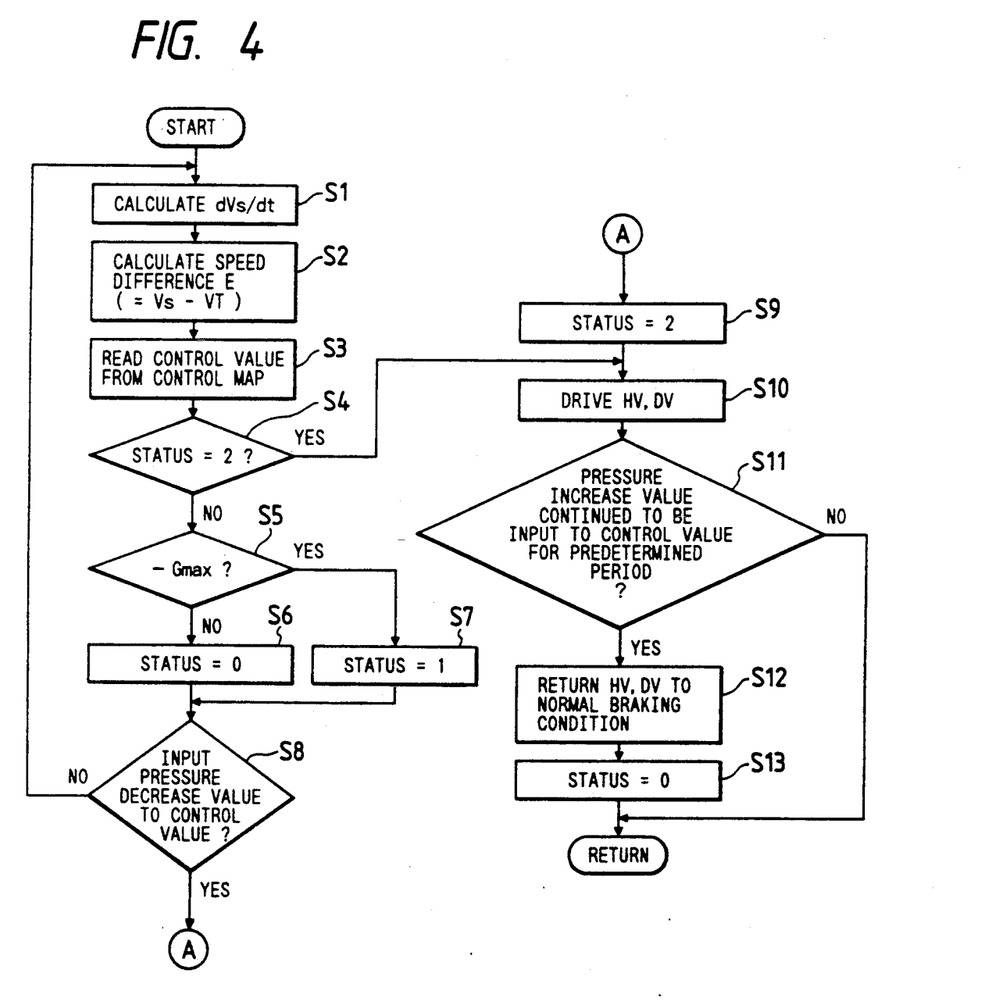
FIG. 4 shows a flow chart of the operation of the control method of the first embodiment.

First, FIG. 3 is discussed. The upper portion of FIG. 3 plots system speed Vs against the target speed VT and the estimated vehicle speed Vv. The middle portion of FIG. 3 illustrates the pressure increase signal 22 and the pressure decrease signal 24 and the resulting operation of the hold valve (Hv) 6 and the decay valve (DV) 7 in relation to the system speed curve Vs shown above. The lower portion of FIG. 3 illustrates the corresponding hydraulic pressure in the brake system during anti-lock control.

Reference is now made to the three statuses shown in FIG. 3.

Status 0 is provided from a time A when the brake switch 4a is turned on by depressing the brake pedal 4 to a time B when the acceleration-deceleration value dVs/dt of the system speed Vs reaches a predetermined deceleration -Gmax, or to the time when the pressure hold region is read from the control map 20. The hold valve 6 is in an open condition, and the decay valve 7 is in a closed condition. Accordingly, the brake hydraulic pressure within the wheel cylinder 11 is increased by the brake fluid fed from the master cylinder 3.

Status 1 is provided from the time B to a time C when a pressure decrease value is read as the control value from the control map 20. The hold valve 6 is closed at the time B to hold constant the brake hydraulic pressure in the wheel cylinder 11.

Status 2 is provided from the time C to a time when a pressure increase value is continually input as the control value for a predetermined time period. During Status 2, the decrease, hold and increase of the brake hydraulic pressure are effected in accordance with the control value read from the control map 20.

Next, the flow chart of FIG. 4 will be described.

Upon start of the control system, the acceleration-deceleration value dVs/dt of the system speed Vs is calculated at step S1, followed by the calculation of the speed difference E between the system speed Vs and the target speed VT (i.e., E=Vs−VT) at step S2. In step S3, the control value is read from the control map 20 (FIG. 2) in accordance with the acceleration-deceleration value dVs/dt and the speed difference E obtained respectively in the previous steps S1 and S2. In step S4, determination is made whether or not status 2 exists; or more particularly, determination is made whether the pressure decrease value is input as the control value obtained from the control map 20. Here, since the result of the decision in step S4 is "NO", the program proceeds to step S5 to determine whether the acceleration-deceleration dVs/dt value of the system speed Vs has reached a predetermined deceleration -Gmax. If the result of this determination is "NO", the status 0 is set in step S6, whereas, if the result is "YES", the status 1 is set in step S7.

In step S8, determination is made whether the pressure decrease value is input as the control value obtained from the control map 20. If the result of this determination is "NO", control is returned to steps 1. On the other hand, if the result is "YES", the status 2 is set in step S9. In accordance with the control value read from the control map, either the duty ratio of the pressure increase signal or the duty ratio of the pressure decrease signal is determined, which dictate whether the hold valve HV and the decay valve DV are driven to be opened or closed at step S10. This control effectuates an increase, hold or decrease of the brake hydraulic pressure.

In step S11, determination is made whether the pressure increase value has been continually input as the control value from the control map 20 for a predetermined time period. During the time when the result of this determination is "NO", the program is returned to step S1. However, when this determination result becomes "YES", the hold valve HV and the decay valve DV are returned to the normal braking condition (i.e., an inoperative condition of the anti-lock control) at step S12. Namely, the hold valve HV is turned off (i.e., opened), and the decay valve DV is turned off (i.e., closed). Afterwards the status 0 is set at step S13 and the program is returned to step S1.

Figure 5:
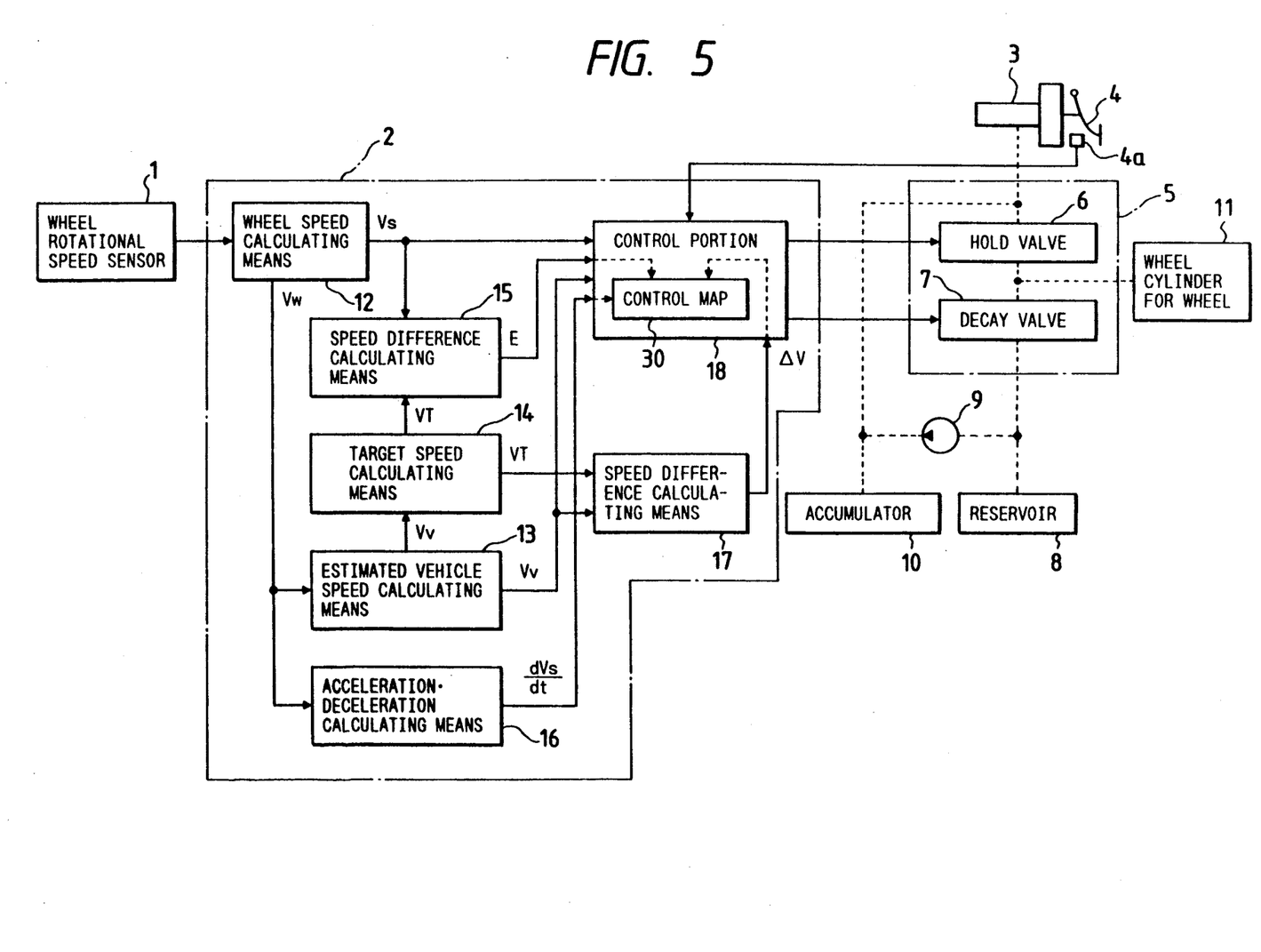
FIG. 5 shows a block diagram of a control system used in a second embodiment of an anti-lock control method of the invention.

FIG. 5 shows a block diagram of a control system used in a second embodiment of the present invention. The construction of the control system is the same as the control system shown in FIG. 1, except a different control map 30 is stored in a control portion 18 and speed difference calculating means 17 is added. Corresponding parts are denoted respectively by identical reference numerals, and repeated explanation of such corresponding parts is omitted.

Figure 6:
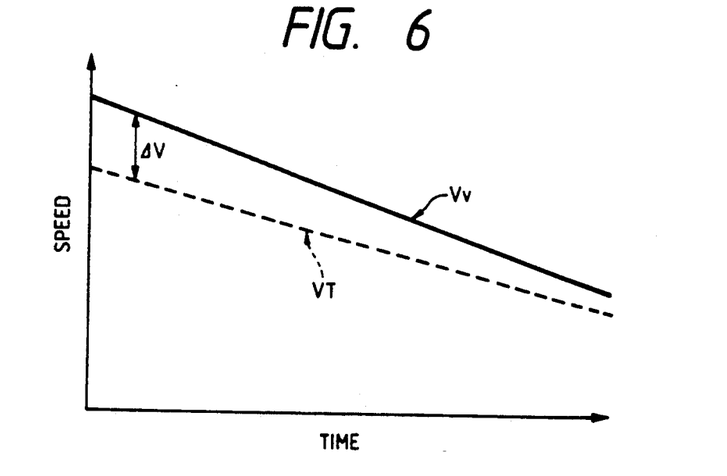
FIG. 6 graphically illustrates a target speed in the control of FIG. 5.

The speed difference calculating means 17 calculates a difference ΔV between an estimated vehicle speed Vv obtained from the estimated vehicle speed calculating means 13 and a target speed VT obtained from the target speed calculating means 14 (i.e. ΔV=Vv−VT). In this embodiment, as shown in FIG. 6, the target speed VT tracks the estimated vehicle speed Vv according to a predetermined ratio, and therefore, the difference ΔV between the two speeds is variable upon the value of the estimated vehicle speed Vv.

Figure 7:
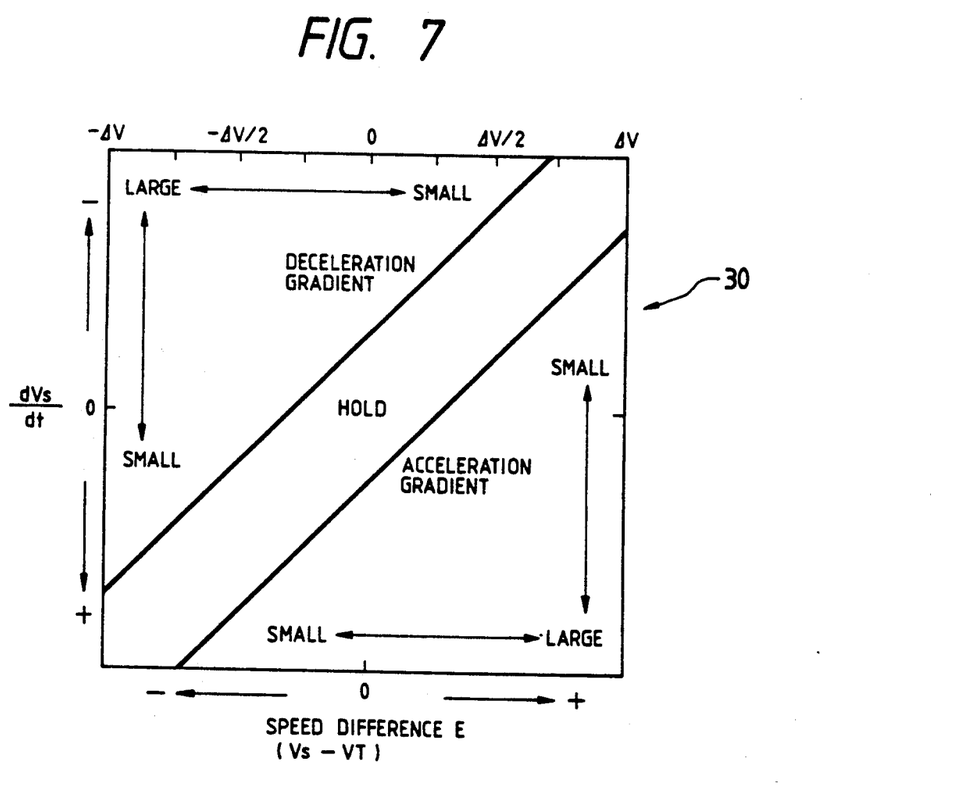
FIG. 7 is a control map used in the anti-lock control method of the second embodiment.

The control map 30, stored in a memory of the control portion 18, is shown in FIG. 7. The control map 30, like the control map 20 of FIG. 2, represents a pressure increase region, a pressure hold region and a pressure decrease region of the brake hydraulic pressure. The abscissa axis represents the speed difference E between the target speed VT and the system speed VS and the ordinate axis represents the acceleration-deceleration value dVs/dt of the system speed Vs. A pressure increase gradient in the pressure increase region and a pressure decrease gradient in the pressure decrease region are used as control values. However, the control map 30 of FIG. 7 differs from the control map 20 of FIG. 2 in that the scale of the abscissa axis of the control map 30 is varied according to the value of the speed difference ▲V when reading the map. More specifically, the difference ▲V between the target speed VT (which is represented with respect to the estimated vehicle speed Vv by the formula, VT=Vv×K wherein 0<K<1) and the estimated vehicle speed Vv is first calculated, and then the abscissa axis is set as a full scale of ±▲V and having the value ▲V equal zero at the center of the axis. For example, in the case of ▲V=10 km/h, the full scale of the abscissa axis of the control map 30 represents a range of ±10 km/h with the center of the axis representing 0 km/h. In the case of ▲V=5 km/h, the full scale of the abscissa axis of the control map 30 represents a range of ±5 km/h with the center representing 0 km/h. Therefore, the entire region of the control map 30 may be effectively used regardless of the value of the difference ▲V. Thus, the system speed Vs approaches the target speed VT more quickly, thereby effectuating control more efficiently.

Figure 8:
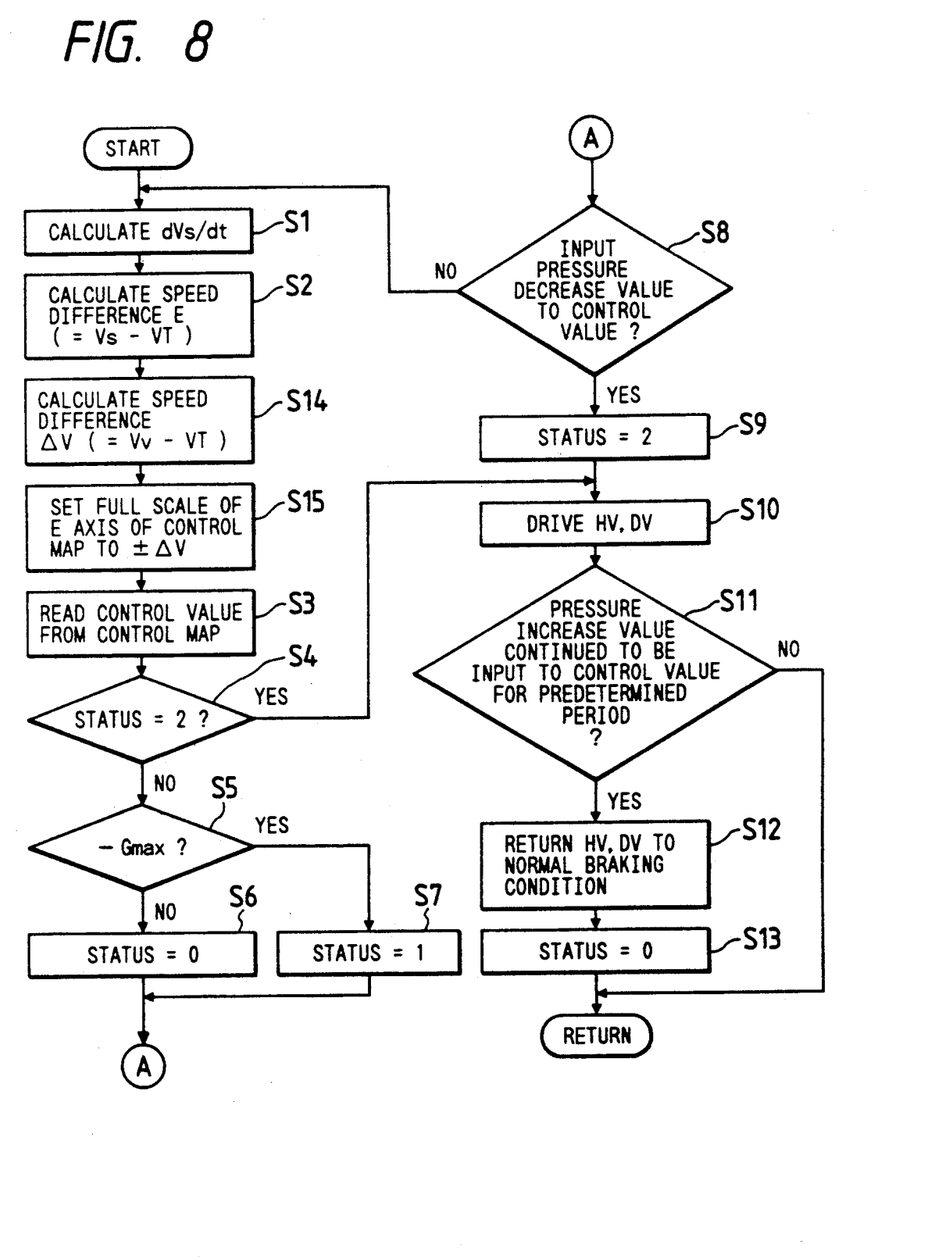
FIG. 8 is a flow chart of the control operation of the control method of the second embodiment.

FIG. 8 shows a flow chart for effecting the control of the second embodiment of the invention. This flow chart differs from the flow chart of FIG. 4 in that steps S14 and S15 are inserted in between steps S2 and S3 of the flow chart of FIG. 4. More specifically, in FIG. 8, the acceleration-deceleration value dVs/dt and the speed difference E are calculated respectively in steps S1 and S2. In step S14, the difference V between the estimated vehicle speed Vv and the target speed VT is calculated (i.e. ▲V=Vv−VT). Then, in step S15, the full scale of the abscissa axis of the control map 30 which represents the speed difference E is set to the value of the difference ▲V obtained in step S14. The program then proceeds to the step 3 and continues as discussed above with reference to FIG. 4.

As is clear from the foregoing, in the present invention, a target speed VT is set to track an estimated vehicle speed Vv according to a predetermined relation, wherein the estimated vehicle speed Vv is calculated based on the highest wheel speed among the four wheel speeds during braking. A control map (FIG. 2) having pressure control regions of the brake hydraulic pressure and pressure gradients provides control values to increase and decrease the brake hydraulic pressure. Therefore, unlike the conventional anti-lock control method, the use of the control map enables anti-lock control to be effected not only by determining the control modes of the pressure increase, pressure hold and pressure decrease as well as the periods thereof, but also by setting the pressure increase gradient in the pressure increase mode or the pressure decrease gradient in the pressure decrease mode. Therefore, the system speed Vs can approach the target speed VT. In this case, the brake hydraulic pressure is kept near a necessary level, and the amplitude of variations of the system speed Vs are damped quickly. Thus, an efficient braking force is obtained, and the vibration of the vehicle body is suppressed.

Further, with respect to variations in the road surface condition (for example, at the time when the vehicle proceeds from a high μ road to a low μ road), even when the system speed Vs is above the target speed VT, the decrease of the brake hydraulic pressure can be effected if the system speed Vs is in deceleration. Therefore, the pressure decrease point is obtained earlier, and a quick response is achieved.

What is claimed is:

1. An anti-lock control system for controlling brake hydraulic pressure applied to wheel brakes of a vehicle, comprising:
   wheel spread sensing means for sensing wheel speeds;
   wheel speed calculating means for calculating a system speed based upon said wheel speeds;
   estimated vehicle speed calculating means for calculating an estimated vehicle speed based upon one of said wheel speeds;
   target speed calculating means for setting a target speed to track said estimated vehicle speed according to a predetermined relation;
   speed difference calculating means for calculating a speed difference between said system speed and said target speed;
   acceleration-deceleration calculating means for calculating an acceleration-deceleration component from said system speed; and
   control means for controlling said brake hydraulic pressure based on said system speed and said acceleration-deceleration component, said control means including a control map having a pressure decrease region with decrease brake hydraulic pressure gradients therein, and a pressure increase region with increase brake hydraulic pressure gradients therein, said increase brake hydraulic pressure gradients representing duty ratios of a first control signal for controlling a hold valve and said decrease brake hydraulic pressure gradients representing duty ratios of a second control signal for controlling a decay valve, said control means reading a brake hydraulic pressure gradient from said control map based on said system speed and said acceleration-deceleration component and controlling said brake hydraulic pressure based on said read brake hydraulic pressure gradient.

2. An anti-lock control system according to claim 1, wherein an abscissa axis of said control map represents said speed difference, and an ordinate axis of said control map represents said acceleration-deceleration component.

3. An anti-lock control system according to claim 2, further comprising:
   second speed difference calculating means for calculating a second speed difference between said estimated vehicle speed and said target speed.

4. An anti-lock control system according to claim 3, wherein a range of said abscissa axis is from a negative value of said second speed difference to a positive value of said second speed difference.

5. An anti-lock control system according to claim 1, wherein said control map further has a pressure hold region between said pressure decrease region and said pressure increase region.

6. An anti-lock control system according to claim 1, wherein the control means controls the brake hydraulic pressure such that the system speed converges to the target speed.

7. An anti-lock control method for a vehicle wherein brake hydraulic pressure applied to wheel brakes of said vehicle is controlled based on a system speed of said vehicle, said system speed based on wheel speeds of said vehicle, said anti-lock control method comprising the steps of:

calculating an estimated vehicle speed based on a highest wheel speed of said wheel speeds during braking;

setting a target speed to track said estimated vehicle speed according to a predetermined relation;

reading from a control map containing a plurality of brake hydraulic pressure gradients a brake hydraulic pressure gradient based on said system speed and a difference between said target speed and said system speed said, control map having a pressure decrease region with decrease brake hydraulic pressure gradients therein, and a pressure increase region with increase brake hydraulic pressure gradients therein said increase brake hydraulic pressure gradients representing duty ratios of a first control signal for controlling a hold valve and said decrease brake hydraulic pressure gradients representing duty ratios of a second control signal for controlling a decay valve; and controlling said brake hydraulic pressure based on said brake hydraulic pressure gradient.

8. An anti-lock control method according to claim 7, wherein in the controlling step, the brake hydraulic pressure is controlled such that the system speed converges to the target speed.

9. An anti-lock control method for controlling brake hydraulic pressure applied to wheel brakes of a vehicle, said anti-lock control method comprising the steps of:

sensing a plurality of wheel speeds from a corresponding plurality of wheels;

calculating a system speed of said vehicle based upon said wheel speeds;

calculating an estimated vehicle speed based upon a highest one of said wheel speeds;

setting a target speed to track said estimated vehicle speed according to a predetermined relation;

calculating a speed difference between said system speed and said target speed;

calculating an acceleration-deceleration component from said system speed;

reading from a control map containing a plurality of brake hydraulic pressure gradients a brake hydraulic pressure gradient based on said acceleration-deceleration component and said speed difference, said control map having a pressure decrease region with decrease brake hydraulic pressure gradients therein, and a pressure increase region with increase brake hydraulic pressure gradients therein said increase brake hydraulic pressure gradients representing duty ratios of a first control signal for controlling a hold valve and said decrease brake hydraulic pressure gradients representing duty ratios of a second control signal for controlling a decay valve; and controlling said brake hydraulic pressure based on said brake hydraulic pressure gradient.

10. An anti-lock control method according to claim 9, wherein in said step of reading from a control map, said control map contains a pressure decrease region with decrease brake hydraulic pressure gradients therein, a pressure hold region, and a pressure increase region with increase brake hydraulic pressure gradient therein, and a location of a brake hydraulic pressure gradient being read is determined by said acceleration-deceleration component and said speed difference; and wherein in said step of controlling said brake hydraulic pressure said brake hydraulic pressure is increased based on a read increase brake hydraulic pressure gradient, and decreased based on a read decrease brake hydraulic pressure gradient.

11. An anti-lock control method according to claim 9, wherein in the controlling step, the brake hydraulic pressure is controlled such that the system speed converges to the target speed.

12. An anti-lock control system for a vehicle comprising:

means for braking said vehicle;

means for calculating a speed value of said vehicle;

means for calculating an acceleration-deceleration value of said speed value; and control means for controlling said braking means based on said speed value and said acceleration-deceleration value, said control means including a control map having a pressure decrease region with decrease brake hydraulic pressure gradients therein, and a pressure increase region with increase brake hydraulic pressure gradients therein, said increase brake hydraulic pressure gradients representing duty ratios of a first control signal for controlling a hold valve and said decrease brake hydraulic pressure gradients representing duty ratios of a second control signal for controlling a decay valve, said control means reading a brake hydraulic pressure gradient from said control map based on said speed value and said acceleration-deceleration value and controlling said braking means based on said read brake hydraulic pressure gradient.

13. An anti-lock control system according to claim 12, wherein an abscissa axis of said control map represents said speed value, and an ordinate axis of said control map represents said acceleration-deceleration value.

14. An anti-lock control system according to claim 12, wherein said control map further has a pressure hold region between said pressure decrease region and said pressure increase region.

* * * * *